United States Patent
Garverick et al.

(10) Patent No.: US 7,562,581 B2
(45) Date of Patent: Jul. 21, 2009

(54) WIRELESS SENSOR PLATFORM FOR HARSH ENVIRONMENTS

(75) Inventors: Steven L. Garverick, Solon, OH (US); Xinyu Yu, Cleveland, OH (US); Lemi Toygur, Cleveland, OH (US); Yunli He, Bedford, OH (US)

(73) Assignee: Case Western Reserve University, Cleveland, OH (US)

( * ) Notice: Subject to any disclaimer, the term of this patent is extended or adjusted under 35 U.S.C. 154(b) by 31 days.

(21) Appl. No.: 11/537,488

(22) Filed: Sep. 29, 2006

(65) Prior Publication Data

US 2007/0186668 A1    Aug. 16, 2007

Related U.S. Application Data

(60) Provisional application No. 60/721,649, filed on Sep. 29, 2005.

(51) Int. Cl.
*H03F 3/04* (2006.01)
*G01B 7/00* (2006.01)
(52) U.S. Cl. .................................. 73/777; 330/303
(58) Field of Classification Search .................. 73/777; 324/160; 330/303
See application file for complete search history.

(56) References Cited

U.S. PATENT DOCUMENTS 6,484,818 B2 * 11/2002 Alft et al. ............... 175/45
6,700,445 B2 * 3/2004 Venkatraman et al. ...... 330/303

OTHER PUBLICATIONS

Toygur, L. Ph.D. Thesis, Case Western Reserve University, Jan. 2004.*
Toygur, L. Ph.D. Thesis, Case Western Reserve University, Jan. 2004. Online date—Jun. 2004 on ProQuest.*
Nicolson, S.; Khoman Phang, "Improvements in biasing and compensation of CMOS opamps," Circuits and Systems, 2004. ISCAS '04. Proceedings of the 2004 International Symposium on, pp. I-665-8 vol. 1, May 23-26, 2004.*
McLaren, A.; Martin, K., "Generation of accurate on-chip time constants and stable transconductances," Solid-State Circuits, IEEE Journal of, vol. 36, No. 4, pp. 691-695, Apr. 2001.*
Geen, J.A.; Sherman, S.J.; Chang, J.F.; Lewis, S.R., "Single-chip surface micromachined integrated gyroscope with 50 /h Allan deviation," Solid-State Circuits, IEEE Journal of, vol. 37, No. 12, pp. 1860-1866, Dec. 2002.*
L. Toygur, X. Yu, and S. Garverick. "High-Temperature, Low-Power 8-MegΩ by 1.2-MegHz SOI-CMOS Transimpedance Amplifier for MEMS-Based Wireless Sensors." IEEE International SOI Conference. pp. 179-181. Oct. 2004.*
B. Razavi, *Design of Analog CMOS Integrated Circuits*, pp. 378-379 and 392-393, McGraw-Hill Book Company, 2001.

* cited by examiner

*Primary Examiner*—Lisa M Caputo
*Assistant Examiner*—Punam Patel
(74) *Attorney, Agent, or Firm*—Tarolli, Sundheim, Covell & Tummino LLP

(57) ABSTRACT

Reliable and efficient sensing becomes increasingly difficult in harsher environments. A sensing module for high-temperature conditions utilizes a digital, rather than analog, implementation on a wireless platform to achieve good quality data transmission. The module comprises a sensor, integrated circuit, and antenna. The integrated circuit includes an amplifier, A/D converter, decimation filter, and digital transmitter. To operate, an analog signal is received by the sensor, amplified by the amplifier, converted into a digital signal by the A/D converter, filtered by the decimation filter to address the quantization error, and output in digital format by the digital transmitter and antenna.

7 Claims, 17 Drawing Sheets

WIRELESS SENSOR PLATFORM FOR HARSH ENVIRONMENTS

CROSS-REFERENCE TO RELATED APPLICATIONS

This application claims the benefit of U.S. Provisional Application Ser. No. 60/721,649, entitled "WIRELESS SENSOR PLATFORM FOR HARSH ENVIRONMENTS," filed on Sep. 29, 2005, the entirety of which is incorporated herein by reference.

GOVERNMENT LICENSE RIGHTS

This invention was made with government support under NCA3-201 and NCC3-1086 awarded by NASA—Glenn Research Center. The United States Government has certain rights in the invention.

BACKGROUND

Various applications, ranging from small to large, simple to complex, use sensors to monitor certain aspects of an environment. For instance, sensors can detect motion in a room to determine whether its ceiling lights should be turned on. Likewise, sensors can be applied to more complex applications, including engine and vehicle control for automotive and aerospace systems, as well as environmental monitoring in mining, geothermal, and well logging. Accordingly, a wide variety of users (e.g., consumers, scientists, and engineers) regularly depend on the consistency and accuracy of sensor data collection and transmission. With the proliferation of technology in control systems, the importance of reliable monitoring and sensing platforms is apparent.

In particular, commercial, industrial, and military applications rely on sensors to provide data relating to safety conditions, travel speeds, and warning signals. While a household or office environment may be fairly easy to monitor, an operating automotive or aerospace system is considerably more difficult to work with. Complications that include temperature, distance, and power considerations distort the signals that the sensors need to monitor. In general, sensors for commercial applications are rated for temperatures as high as 70° C., industrial applications at 85° C., and military applications at 125° C.

While slight distortions may not adversely impact the entire system, severe distortions may flag a false signal (or fail to flag an existing signal) which in turn can expose people to dangerous situations. When sensors fail to properly perform, the resulting effect may be at the least, inconvenient, and at the most, life-threatening. For example, if a motion detecting sensor fails to signal the lights on in a room, a person in the room would merely be inconvenienced into walking over to the wall to manually flip the light switch on. Meanwhile, if an automobile brake sensor fails to activate the anti-lock braking system while the vehicle is traveling at high speeds, the car could spin out of control and put the driver and passengers (along with others in the vicinity) in severe danger.

A harsh environment calls for a more robust sensing system. In order to progress with reliable operations and research, it is therefore imperative that sensor modules efficiently maintain proper signal monitoring in harsh environments.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to reliable sensing in harsh environments, and more particularly to a low power wireless sensor module suitable for use in high-temperature environments. On-engine and on-transmission automotive applications can arrive at temperatures of greater than 200° C., and even higher for wheel-mounted applications. To maintain the quality of signals in harsh environments, one embodiment integrates improvements including localized amplification, signal conditioning, and wireless data acquisition, while keeping the level of power consumption low.

Microelectronics based on bulk CMOS (Complementary Metal Oxide Semiconductor) technology has traditionally been operated at temperatures less than 150° C., but SOI (Silicon-On-Insulator) and SiC (Silicon-Carbide) technologies can withstand even higher temperatures (i.e., 300° C. and 600° C., respectively) without suffering from excessive junction leakage currents. In SOI technology, bulk junction isolation is replaced by an insulator (e.g., sapphire). The two primary SOI variations are: partially depleted and fully depleted. The depletion region of partially depleted SOI does not reach through the entire body, causing the body to float and the transistors to exhibit the "kink effect," a pronounced increase in the slope of the $I_{DS}$ vs. $V_{DS}$ characteristic. Such characterization in analog circuits is equivalent to a low incremental output resistance. Fully depleted SOI transistors have a poor output resistance, but good leakage characteristics.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
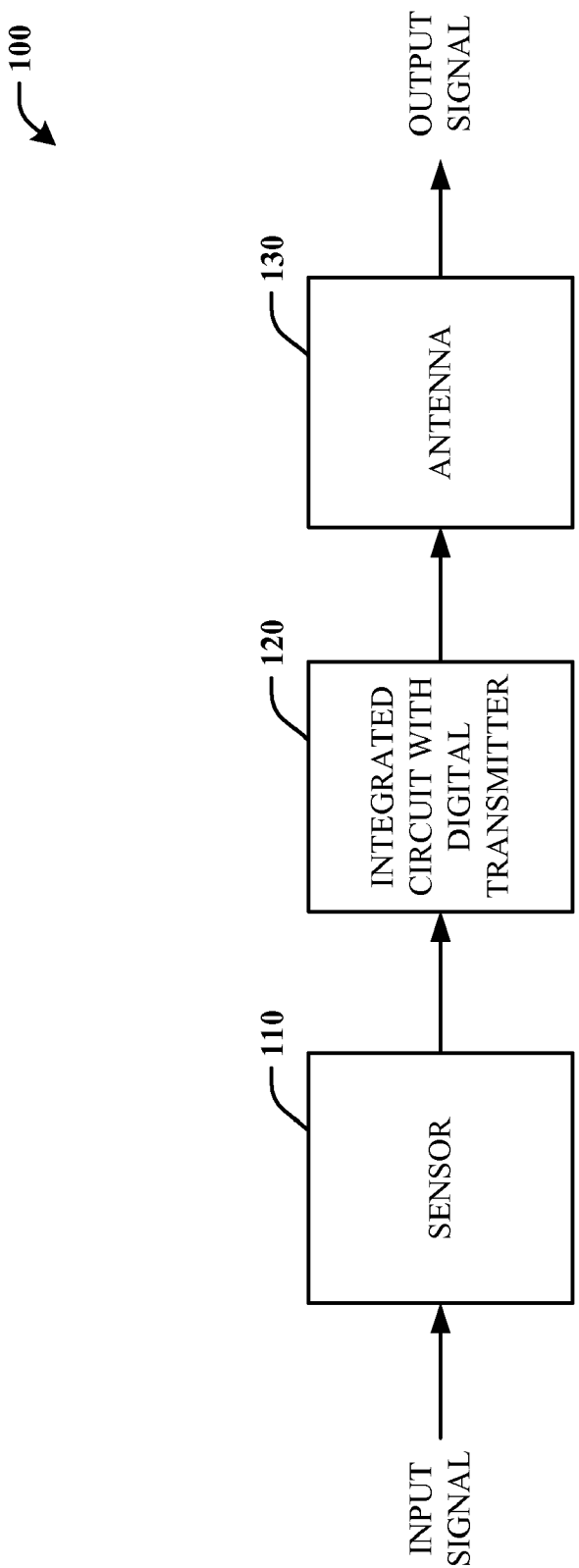
FIG. 1 is a block diagram of a wireless sensor module.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

In FIG. 1, a block diagram of a high-temperature, low power sensor module 100 that facilitates reliable sensing in harsh environments is illustrated. The sensor module 100 comprises a sensor 110 that retrieves information from an environment, an integrated circuit with digital transmitter 120 that performs signal processing, including amplification, conversion, and filtering, and an antenna 130 that communicates the resulting output signal to a receiver. The sensor 110 receives an analog input signal to be processed by the integrated circuit 120. The sensor may be resistive, capacitive, or a combination of the two. Regardless of which type of sensor is implemented, the AC admittance of the sensor can be recovered by the amplifier through conventional digital demodulation of the signal. More specifically, the integrated circuit 120 amplifies the received analog signal, converts the signal into digital form, and filters the resulting digital signal. Such signal is output by a digital transmitter as part of the integrated circuit 120 and antenna 130 so that it may be received wirelessly by a receiver. One advantage of wireless implementation is the absence of tangled wires, especially for rotating systems such as automotive wheels. Another advantage is a less restricted range in distance from which the module can operate.

Figure 2:
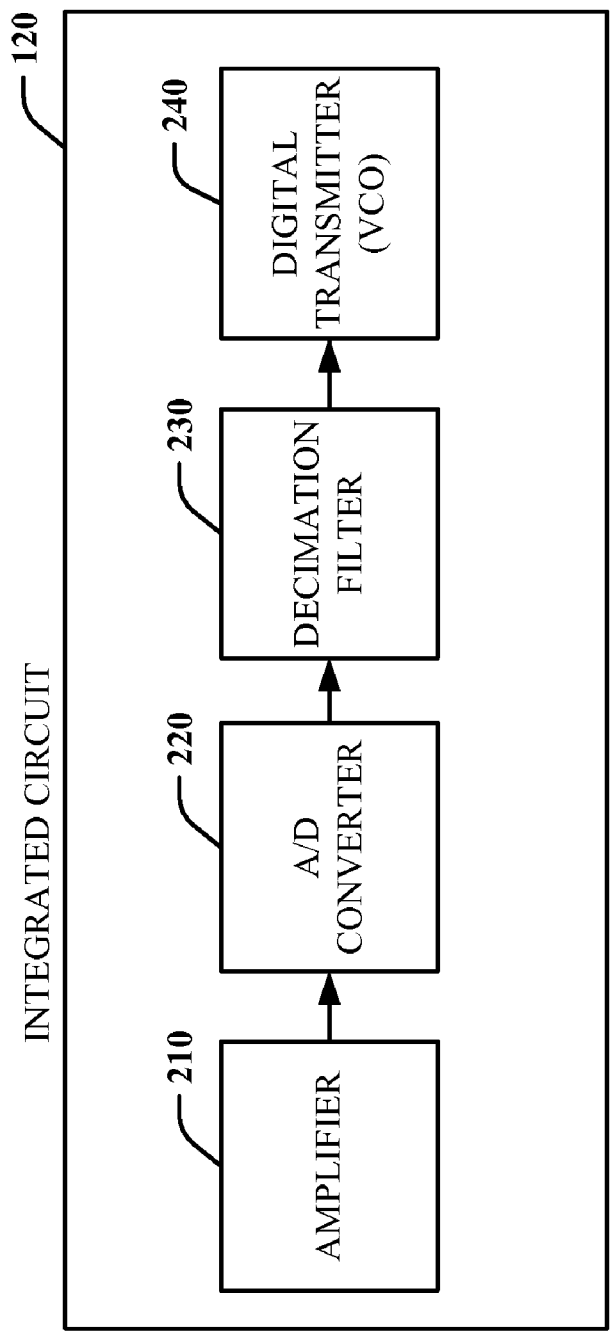
FIG. 2 is a block diagram of an integrated circuit used in a wireless sensor module.

FIG. 2 depicts a block diagram of an integrated circuit 120 that facilitates amplification, conversion, filtering, and transmitting of an input signal. The integrated circuit 120 comprises an amplifier 210, such as an SOI-CMOS transimpedance amplifier, that amplifies the input signal. The SOI-CMOS transimpedance amplifier 210 has a low input resistance suitable to receive data from MEMS-based high-impedance capacitive sensors. Such type of wide-gain-bandwidth amplifier can also act as a stable oscillator by counter-acting the series resistance of a resonant device. As a result, the amplifier provides a gain greater than 2 MΩ and a bandwidth greater than 0.3 MHz for temperatures up to 300° C.

The integrated circuit 120 also comprises an A/D converter 220, such as an SOI-CMOS $1^{st}$-order sigma-delta A/D converter, that converts the received analog input signal into digital format. The SOI-CMOS $1^{st}$-order sigma-delta A/D converter 220 is capable of high-temperature performance with imprecise components using fully differential switched-capacitor circuits plus dynamic element matching, dithering, and chopper stabilization. The binary output of the comparator results in quantization error. However, the output tracks the input and reduces the error by the oversampling ratio, and the signal proceeds through a low-pass decimation filter 230 that removes the quantization error. Further included in the integrated circuit 120 is a digital transmitter (i.e., voltage-controlled oscillator) 240. The digital FSK (frequency shift keying) transmitter 240 facilitates propagation through harsh environments through the selection of a relatively low carrier frequency and corresponding longer wavelength. A loop antenna serves as an inductor and combines with the capacitance of a tunnel diode and PMOS varactor to form a tank circuit. The wireless transmission of data can then be sent to a receiver for further evaluation or processing. Overall, the integrated circuit 120 facilitates the process of amplifying an analog signal, converting the analog signal to digital form, and filtering the digital signal to remove errors.

The SOI-CMOS transimpedance amplifier 210 can serve a dual purpose: to acquire data from MEMS-based impedance sensors and to construct an oscillator using a MEMS resonator. The amplifier 210 functions while maintaining a wide gain-bandwidth at all temperatures (i.e., up to 300° C.), sustaining low power consumption (i.e., under 1 mW), and utilizing a small die area (i.e., 8500 μm²).

The sigma-delta A/D converter 220 receives an amplified analog signal from the amplifier 210, converts the signal from analog to digital format, and sends a digitally converted signal to the decimation filter 230. The A/D converter 220 achieves a high SNR (signal to noise ratio) while drawing a low level of static power. In one example, at room temperature the A/D converter 220 achieves an SNR above 50 dB while drawing 1.32 mW from a 3.3 V power supply. In another example, at temperatures greater than 250° C., the A/D converter 220 achieves an SNR above 40 dB while drawing less than 2 mW, also from a 3.3 V power supply. After the signal conversion, the decimation filter 230 receives the digital signal from the A/D converter 220 and proceeds by removing the quantization error introduced by the A/D converter, through low-pass filtering. The digital transmitter 240 is essentially a voltage-controlled oscillator and transmits the digital signal.

Figure 3:
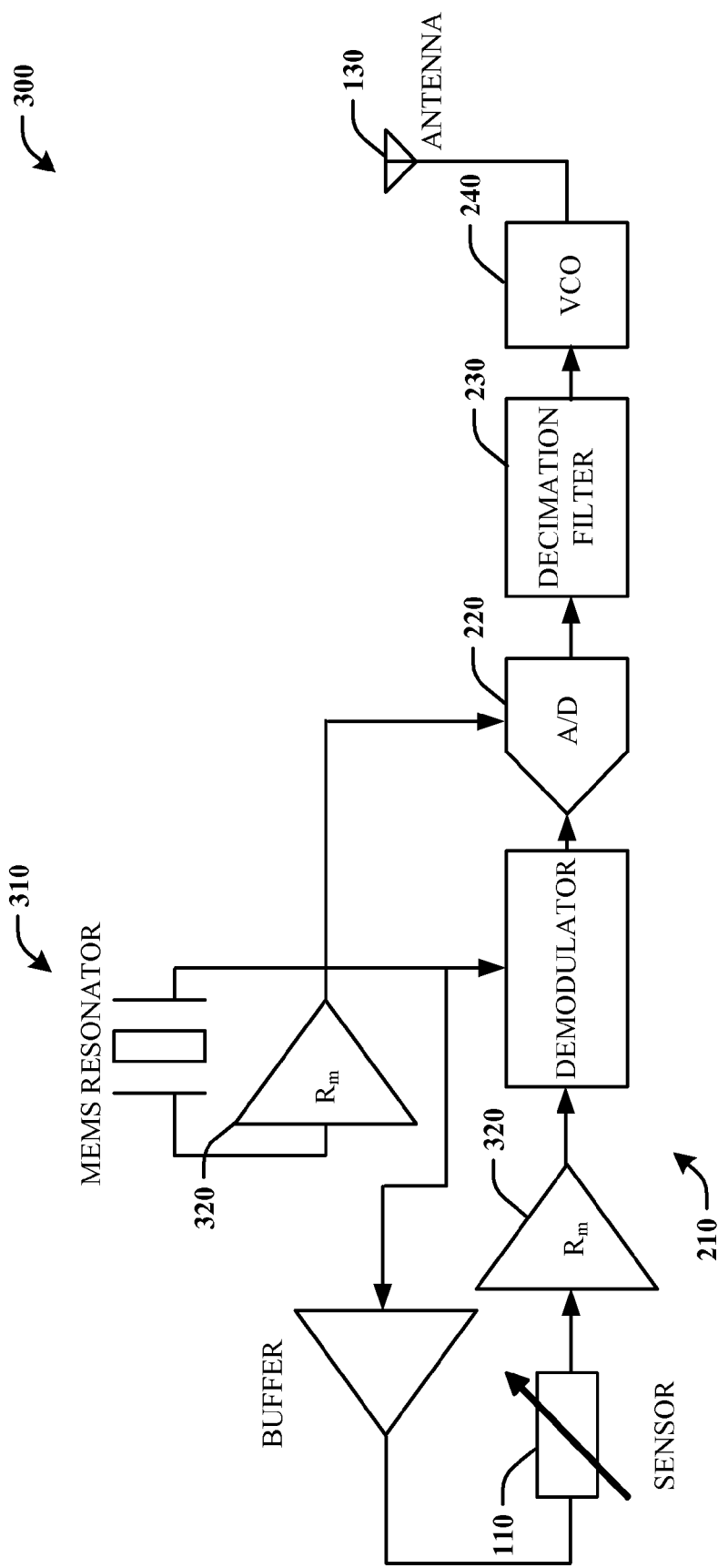
FIG. 3 is a schematic block diagram of a wireless sensor module.

In FIG. 3, a schematic block diagram of a wireless sensor module 300 is presented. The sensor module 300 comprises a sensor 110 that collects information from an environment, two instances of the transimpedance amplifier 210 (an oscillator 310 and a sensor interface amplifier 210) that provides for amplification, a sigma-delta A/D converter 220 that manages conversion of an analog signal to digital form, a decimation filter 230 that removes errors from the resulting digital signal, an FSK transmitter/voltage-controlled oscillator 240 that provides transmission assistance in harsh environments, and an antenna 130 that broadcasts the signal transmission.

First, the sensor 110 receives an analog signal. One instance of the amplifier 320 is used in conjunction with a MEMS resonator to construct an oscillator 310; the second instance of the amplifier 320 is used in a synchronous detection scheme to measure sensor impedance 210. The amplifier 320 can be used to counteract the series resistance of a resonant device to form a stable oscillator 310, through a design that provides the gain and bandwidth necessary to construct high-temperature high-Q integrated oscillators 310 using SiC MEMS lateral and vertical resonators having motional resistance over 1 MΩ and resonant frequencies as high as 1 MHz.

The sensor interface amplifier 210 is able to acquire data from high-impedance sensors (e.g., MEMS capacitive sensors) and can recover the AC admittance of the sensor 110 via synchronous demodulation with in-phase and/or a quadrature reference signal, regardless of whether the sensor is resistive, capacitive, or a combination.

The analog signal is then converted into digital form by the A/D converter 220 and filtered by a low pass decimation filter 230. The resulting digital signal is transmitted by the FSK transmitter (essentially a voltage-controlled oscillator operated with binary input) 240 and antenna 130.

Figure 4:
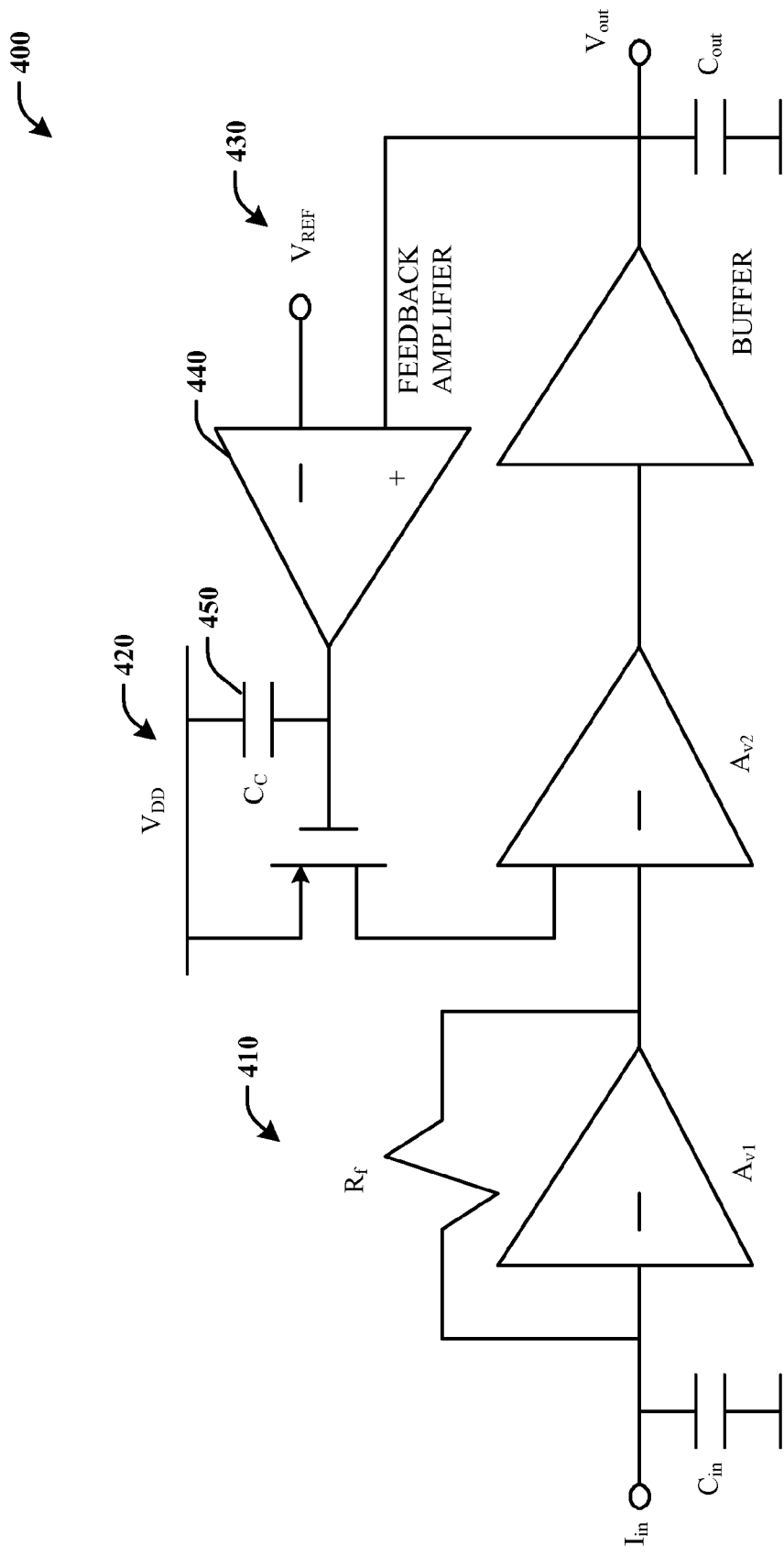
FIG. 4 is a schematic block diagram of a transimpedance amplifier.

FIG. 4 illustrates a schematic block diagram of an amplifier 400 that amplifies an analog input signal. The transimpedance amplifier 400 employs a three-stage topology 410, 420, and 430 that features feedback biasing 440 and a Class AB output stage 430. Class AB is defined by a proportion of 50-100% of the input signal cycle is used to actually switch on the amplifying device. A very large, positive, transresistance gain was achieved using a simple inverting transimpedance stage 410 followed by an open-loop common-source voltage amplifier stage 420. A Class AB output stage 430 provides unity gain and low output impedance. The output is supplied to a feedback bias amplifier 440 that stabilizes the operating point of the second stage 420. The transresistance gain of the first stage 410, $R_f$, is made as large as possible, but must be limited by the requirement for low input impedance:

$$R_{in} \cong R_f/A_{v1}$$

where $A_{v1}$, is the open-loop gain of the first stage amplifier 410. The overall transresistance gain of the amplifier 400 is approximately $R_m = A_{v2} * R_f = A_{v2}/g_{m4}$.

The input of the transimpedance amplifier must be less than the impedance of parasitic capacitance at the input, $C_{in}$, in order to avoid excessive loss of signal at the desired operating frequency of 1 MHz. In order to facilitate loading of the second stage 420, and to reduce die area, $R_f$ was implemented using a source follower stage having a transconductance of $g_{m4}=10$ μS to achieve a small-signal resistance 100 kΩ. Since the amplitude of the first stage output 410 is less than 10 mV, this implementation has acceptable linearity.

The bandwidth of the feedback biasing loop, and therefore the low-frequency cutoff of the signal path, is set by the transconductance of the feedback amplifier 440, the compensation capacitor $C_C$ 450, and the voltage gain of the cascode bias circuit used by the second stage 420. In one instance, the transconductance of the feedback amplifier 440 has been made relatively large such that an off-chip capacitor of a convenient value such as 100 nF can be used to customize the low-frequency cutoff of the signal path. However, $C_C$ 450 could be integrated by using a low-$g_m$ feedback amplifier.

Figure 5:
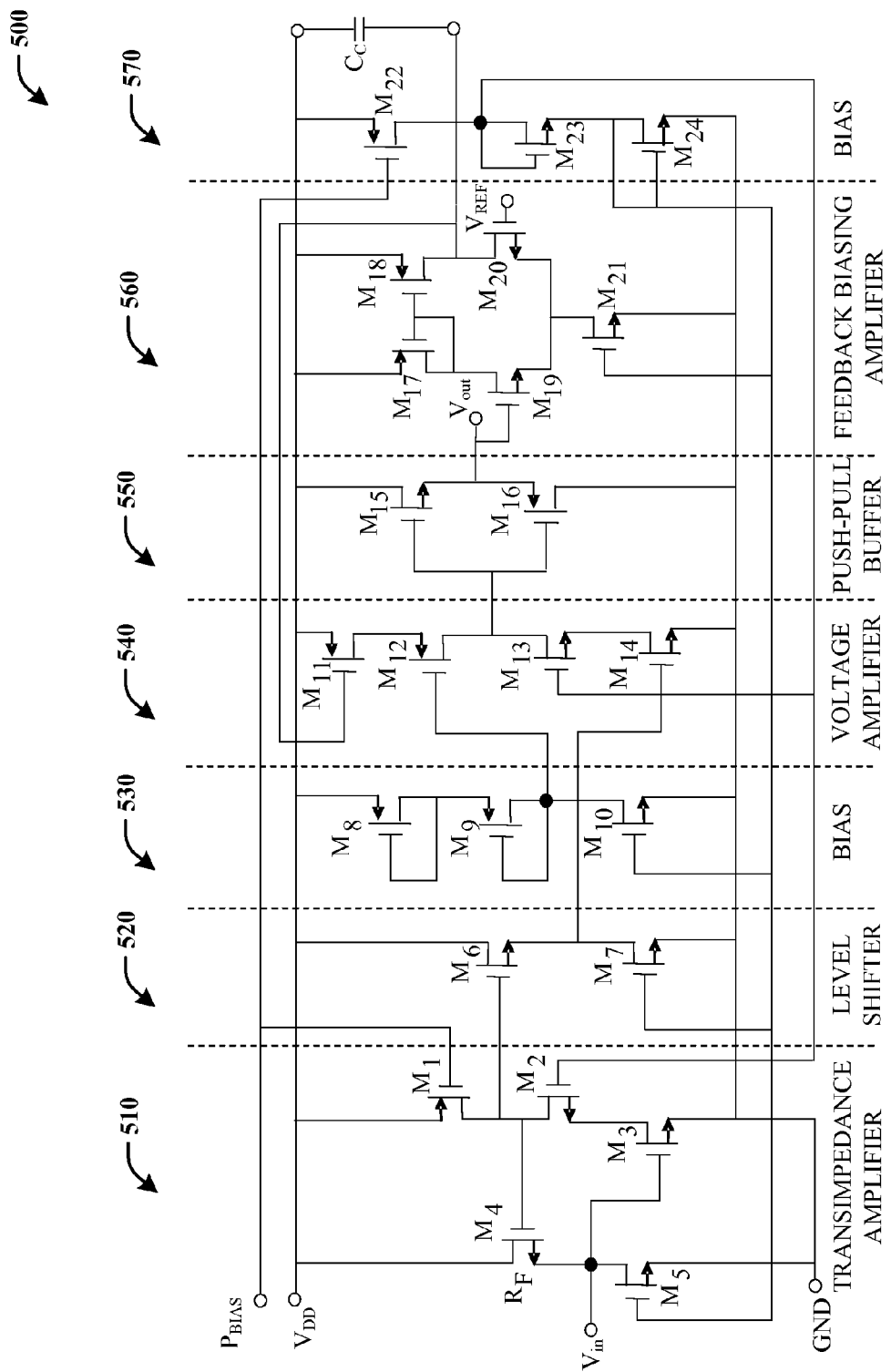
FIG. 5 is a transistor level circuit schematic of a transimpedance amplifier.

Turning to FIG. 5, a transistor level circuit schematic of an amplifier 500 that amplifies the initial input signal is presented. The labels M1 through M24 in the schematic refer to transistors. The circuit schematic 500 is comprised of various parts, namely the transimpedance amplifier 510, level shifter 520, bias 530, voltage amplifier 540, push-pull buffer 550, feedback biasing amplifier 560, and bias 570.

The first (M1-M3) 510 and second (M11-M14) 540 stages employ cascoded common-source stages to improve voltage gain. A source-follower level-shifter (M6-M7) 520 is inserted between the first 510 and second 540 stages in order to minimize capacitance loading on the first stage 510 and to establish the necessary bias voltage for the second stage 540 input.

The output resistance of the first stage 510 is dominated by the output resistance of M1, $r_{o1}$, since the resistance due to the M2-M3 cascode is much larger. Therefore, $A_{v1}$ is approximately $g_{m3}r_{o1}$ which is proportional to L1, the length of M1. L1 is made relatively large to obtain high voltage gain, but is limited by the need to obtain a resistance that is low enough to obtain a satisfactory non-dominant pole frequency in the first stage 510 feedback loop.

The Class AB output stage (M15-M16) 550 employs a simple push-pull configuration that takes advantage of the near-zero-threshold transistors that are available in the process technology. Accordingly, the push-pull buffer does not exhibit the cross-over distortion that is typical for this configuration. Bias current in this stage is sensitive to process variations, but variation is within tolerable limits and the simple implementation has high bandwidth and low power dissipation. Reference voltage $V_{REF}$ and bias voltage $p_{BIAS}$ are provided by an on-chip bandgap-voltage reference circuit, and cascode bias voltages are generated within the transimpedance amplifier 500.

Transistors with near-zero-threshold voltage may be used to minimize the supply voltage. Alternatively, current mirrors can be designed using transistors with larger room-temperature threshold voltages since the threshold voltages of enhancement devices shift toward zero at elevated temperatures, ultimately causing depletion-mode behavior and degrading the desired behavior of diode-connected transistors.

Figure 6:
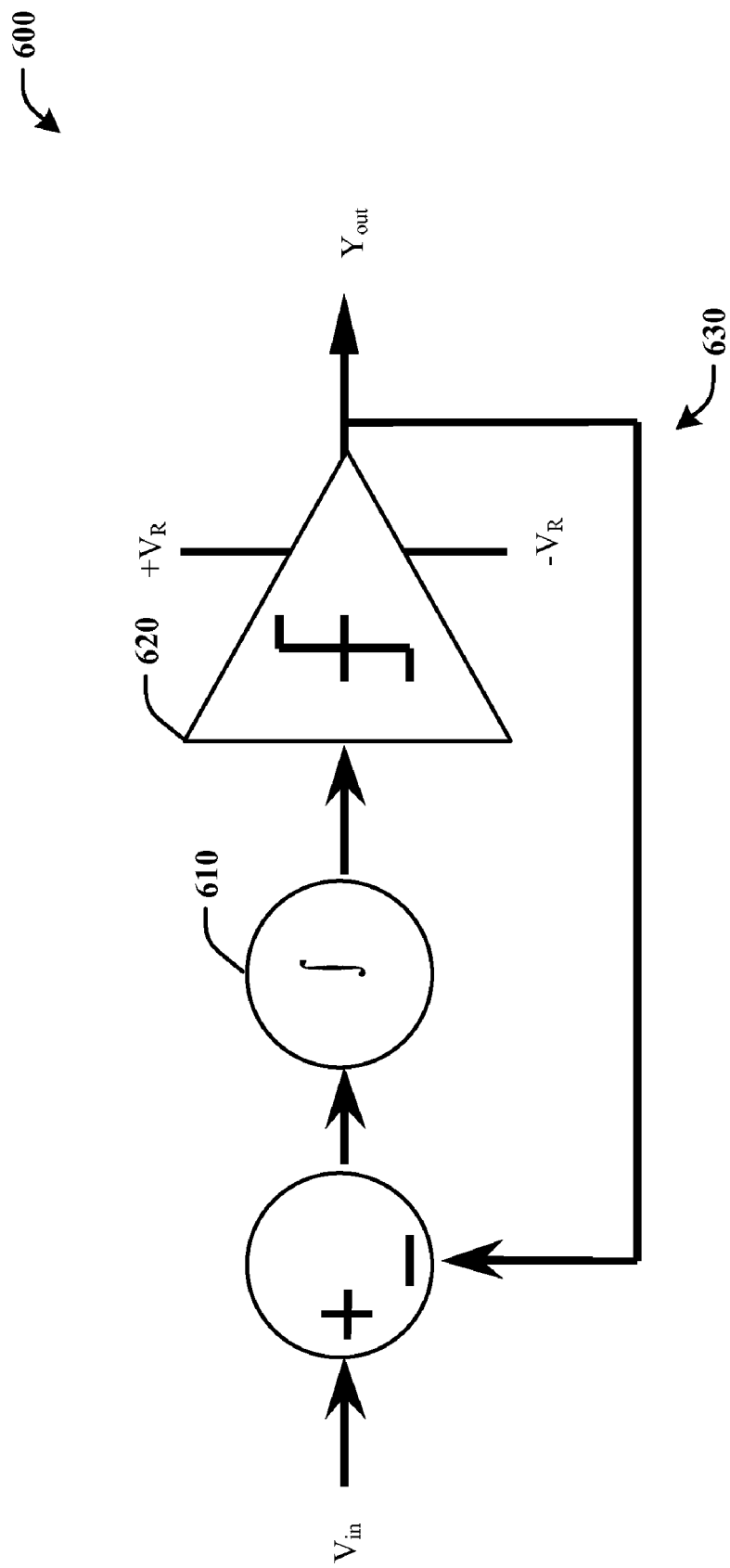
FIG. 6 is a block diagram of a $1^{st}$-order sigma-delta A/D converter.

Continuing to FIG. 6, a block diagram of an A/D converter 600 that manages the conversion of the analog input signal into digital form is depicted. The block diagram of a $1^{st}$-order $\Sigma\Delta$ A/D converter 600 uses an integrator 610 and comparator 620 in a feedback configuration 630. Two-level quantization is performed through the use of a comparator 620, resulting in quantization error. Since the low-frequency gain of the integrator 610 is very large, the output tracks the input 630 and the nonidealities from quantization are reduced by the oversampling ratio.

Figure 7:
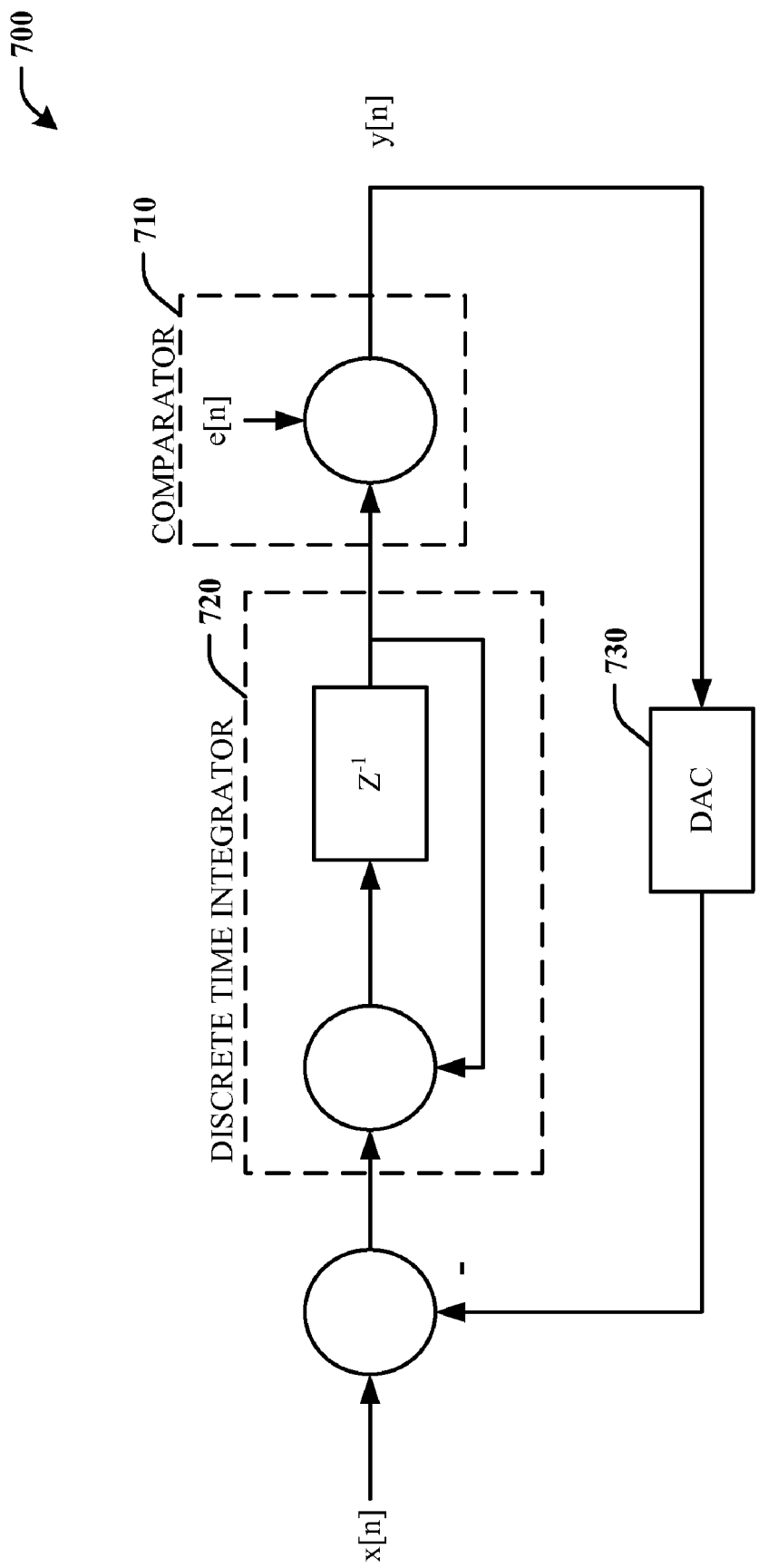
FIG. 7 illustrates a discrete-time model of a $1^{st}$-order sigma-delta A/D converter.

In FIG. 7, a discrete-time model of an A/D converter 700 in accordance with an aspect of an embodiment is illustrated. The discrete-time model of the $\Sigma\Delta$ A/D converter is illustrated by a discrete time integrator 710, comparator 710, and D/A converter 730. Where e[n] represents quantization error introduced by the comparator, the output y[n] is a delayed version of the input plus the difference of two e[n] samples:

$$y[n]=x[n-1]+(e[n]-e[n-1])$$

The quantization error is thus pushed away from the signal band and can subsequently be removed by digital low-pass filtering. Given a goal of 8 b resolution and a signal bandwidth of 16 kHz, a sampling rate of 1 MHz may be selected to provide an oversampling ratio of 64. A full-scale reference voltage of ±1.8 V may be generated using an on-chip self-biased reference circuit, and integrator gain may be set to ½ to avoid integrator saturation.

Figure 8:
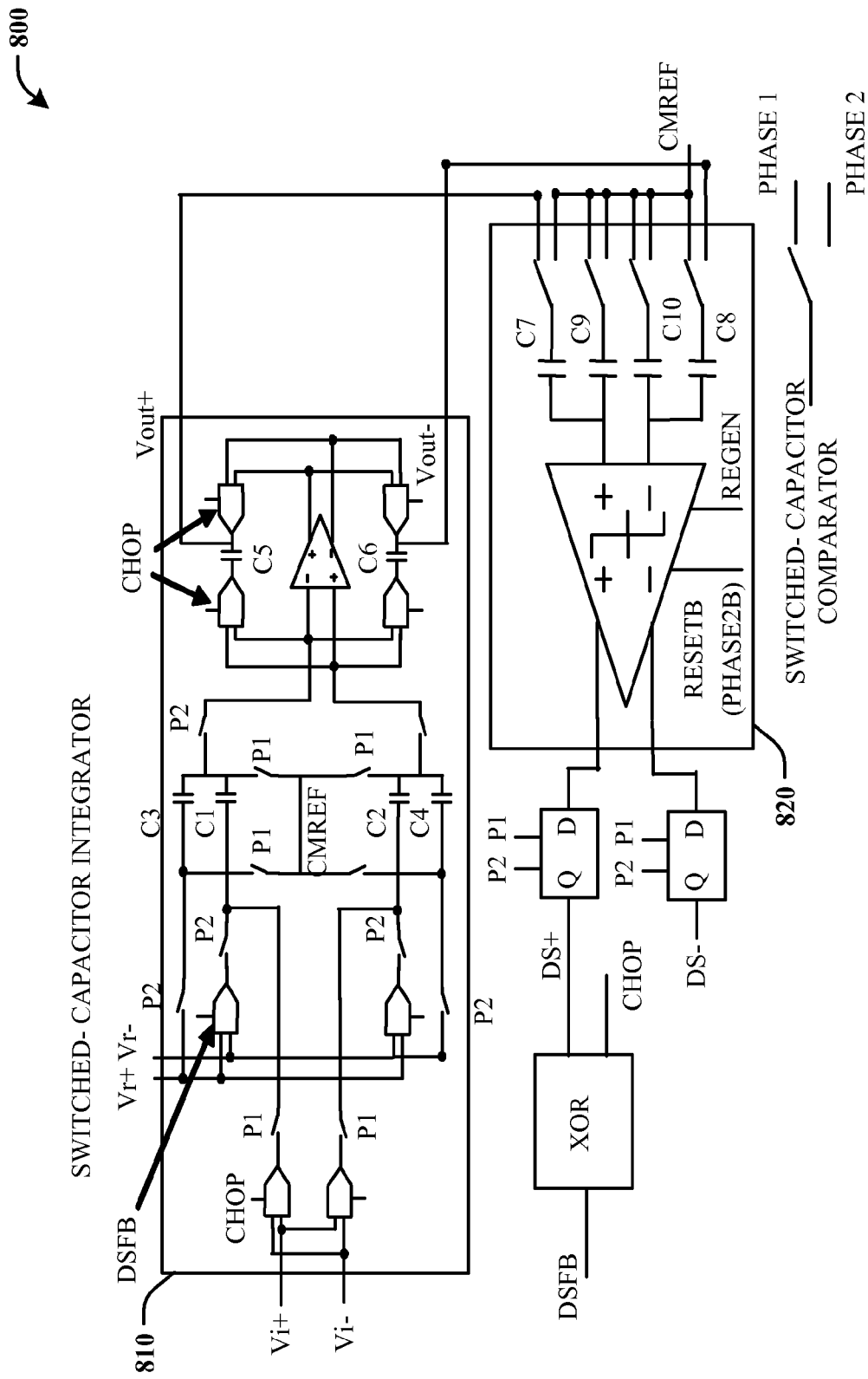
FIG. 8 is a schematic block diagram of a $1^{st}$-order sigma-delta A/D converter incorporating chopper stabilization, dynamic element matching, and input dither.

FIG. 8 shows a schematic block diagram of an A/D converter 800 in accordance with an aspect of an embodiment. The label "P1" refers to phase 1, the label "P2" refers to phase 2, and the label "CHOP" refers to a chopping signal. The converter 800 includes a switched-capacitor integrator 810 and a switched-capacitor comparator 820, which are fully differential. Although power consumption for a given thermal noise is increased in comparison to a single-ended topology, power supply and common mode rejection are much improved, and charge injection effects can be much more easily managed.

A chopping signal "CHOP" is generated at 1/64 of the sampling clock and used to perform dynamic element matching by swapping C1-C2, to add a dither of $V_R/16$ using C3-C4, and to stabilize the integrator operational amplifier by swapping C5-C6. The comparator 820 is offset-cancelled by chopper stabilization using C7-C10. The integrator 810 uses a folded cascode operational amplifier that is biased using a common-mode feedback loop. A bottom-plate sampling scheme is used to minimize charge injection and capacitance on the summing node.

Figure 9:
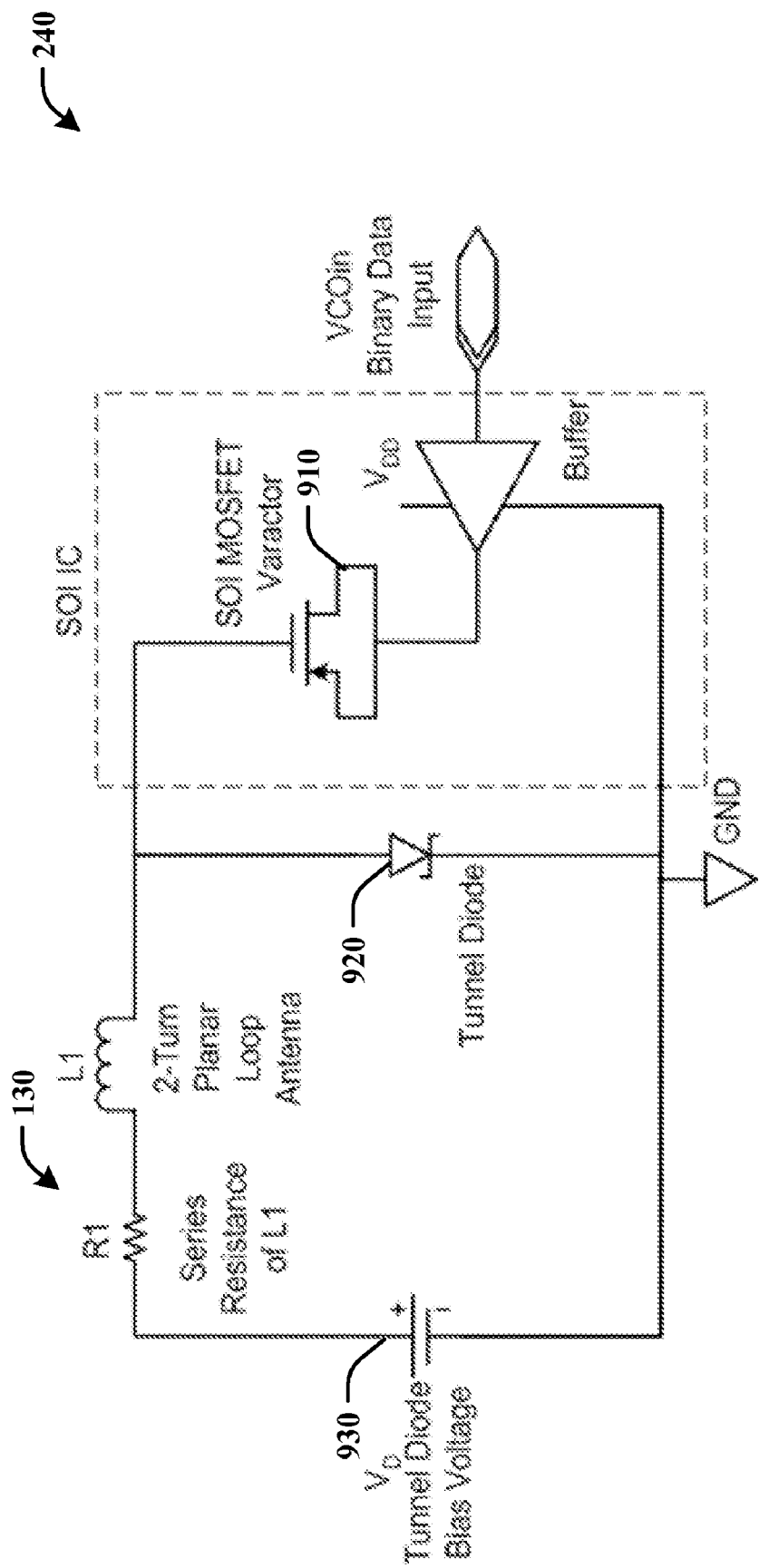
FIG. 9 is a circuit schematic of a digital FSK transmitter.

FIG. 9 illustrates a circuit schematic of a digital FSK transmitter in accordance with an aspect of an embodiment. The high-temperature, low-power digital transmitter 240 uses an SOI MOS varactor 910, Si tunnel diode 920, and planar loop antenna 130 to implement FSK. In particular, a two-turn, 250 nH planar loop antenna 130 serves as an inductor that combines with the capacitance of the tunnel diode 920 and PMOS varactor 910 to form a tank circuit, resonating at about 27 MHz. This relatively low carrier frequency was chosen primarily for its long wavelength and ability to propagate through harsh environments (e.g., engine compartments) of high conductivity. This band provides 326 kHz bandwidth of low-interference spectrum for low-power communications and allows for a data rate of approximately 80 kbps with FSK—adequate for most sensor applications. The tunnel diode 920 is biased at around 0.21 V and 1.75 mA 930 to provide a negative resistance that compensates for losses in the LC tank circuit in order for oscillations to be sustained. When the binary (digital) input switches from low to high, the varactor 910 switches from depletion to inversion with a three times measured change in capacitance. This results in a significant and reliable shift in oscillation frequency.

Such numerical ranges and biases may be adjusted as desired for a specific situation or application. The FCC ISM (industrial, scientific, medical) frequency band, located mainly at low frequencies (i.e., less than 50 MHz) and high frequencies (i.e., above 1 GHz), was utilized to avoid potential interferences. In consideration of this specific embodiment, the lowest ISM frequency consistent with the desired data rate (i.e., 80 kbps) was selected. Various digital modulation choices include ASK (amplitude shift keying), PSK (phase shift keying), and FSK (frequency shift keying), via binary-modulation or M-ary modulation. In one implementation, BFSK (binary frequency shift keying) was selected to reduce the required amplitude resolution in the demodulator and provide a simple and efficient implementation.

As opposed to ASK, FSK is not highly sensitive to amplitude noise—such consideration is imperative in this implementation. In terms of signal quality, spectral efficiency, and power efficiency, the following comparison summarizes BFSK and BPSK performance.

|  | BFSK | BPSK |
|---|---|---|
| BER | $P_{e,BFSK} = Q\left(\sqrt{\dfrac{E_b}{N_0}}\right)$ | $P_{e,BPSK} = Q\left(\sqrt{\dfrac{2E_b}{N_0}}\right)$ |
| Spectral Efficiency | $BW = 2f_b + \Delta f$ | $BW = 2f_b$ |
| Power Efficiency | Good | Poor |

Signal quality is expressed in terms of BER (bit error rate), which is the probability of error in the presence of noise and other interferences. As shown above, BER is a function of energy per bit $E_b$, noise $N_0$, and probability of error $Q(x)$, assuming the received signal is corrupted by additive white noise. $E_b$ can be written as $E_b = A_C^2 T_b/2$ where $T_b$ is the bit duration, $1/T_b$ is the bit rate $f_b$, $A_c$ is the amplitude of the modulated signals. $Q(x)$ in an FSK system is given by:

$$Q(x) = \tfrac{1}{2} erfc(x/\sqrt{2})$$

where erfc is the complementary error function. The BER can be lowered by increasing the signal power or decreasing the data rate. Note that the transmit power can be 3 dB lower in BPSK than BFSK for the same BER.

BPSK occupies twice of the bit rate, 2 $f_b$, while BFSK depends on the bit rate $f_b$ and the frequency spacing $\Delta f$ that separates a logic 0 from a logic 1. Frequency deviation $\Delta f$ can be as low as 0.5 $f_b$, but 2 $f_b$ provides robust communication. If $\Delta f$ is 2 $f_b$, the total spectrum occupied by BFSK spreading is 4 $f_b$, twice that required by BPSK. Nevertheless, BFSK may be used in low data rate applications where $E_b$ can be maximized by a long bit period.

The FSK technique has better power efficiency performance than PSK since the FSK signal has no abrupt phase change and does not require "spectral regrowth" to smooth the waveform. Accordingly, FSK has a better adjacent channel power ratio, while PSK requires a more complicated circuit to achieve similar performance.

The planar loop antenna 130 may be implemented using a gold-on-ceramic module suitable for high-temperature applications. Considering the transmission distance in short range, the antenna operates in the near field (r<<wavelength) by induction. With the goal of 2.58 cm diameter, the square loop was selected to maximize the area because radiation power is proportional to the square of loop area. A 2-turn, square-shape with 2.58 cm side length (diameter) planar loop antenna 130 may be employed to increase the radiation power.

The varactor 910 is SOI MOS fabricated using the Peregrine UTSi 0.5 μm process. The MOS capacitance consists of overlap capacitance and parallel plate capacitance. The overlap capacitance is due to overlap of the gate polysilicon over the edge of the drain region. This capacitance is relatively constant with the applied gate voltage $V_{SG}$. The parallel plate capacitance is the gate oxide capacitance, which is highly variable, depending on $V_{SG}$.

Figure 14:
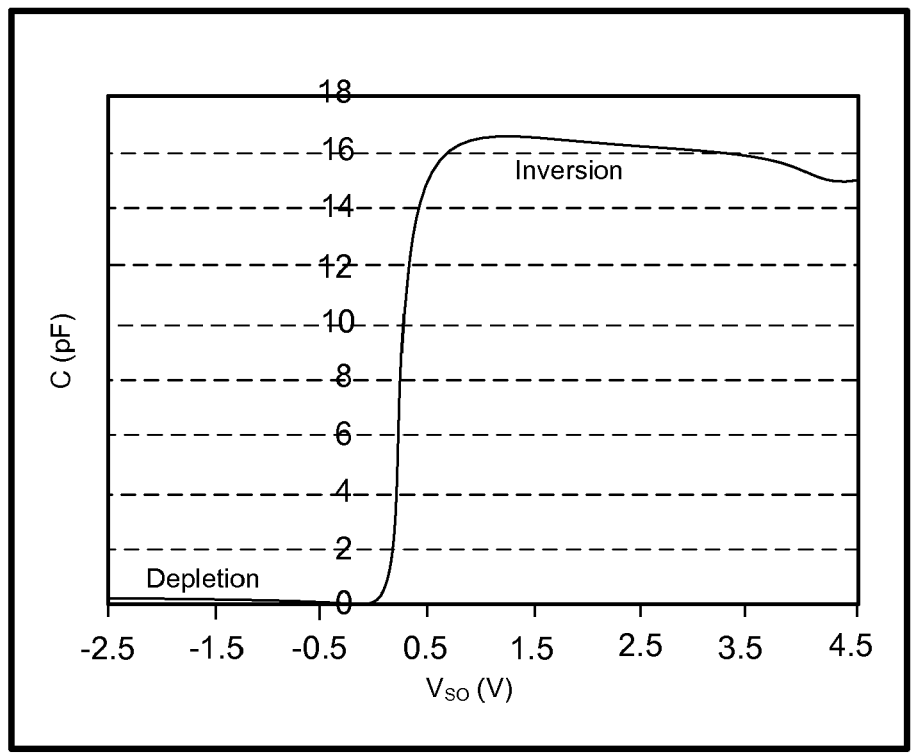
FIG. 14 is a graph depicting measured C-V characteristics of a transistor.

When $V_{SG} > |V_{TH}|$, the device is in the inversion region and the capacitance is dominated by the parallel plate capacitance (Cox). When $V_{SG} < |V_{TH}|$, the device is the depletion region and the capacitance is dominated by overlap capacitance. With the gate of the PMOS biased at 0.21V, for binary 0, $V_{SG} = -0.21V$; and for binary 1, $V_{SG}$ is well above $V_{TH}$. When the binary data input is switched from low to high, the capacitance changes distinctly, causing the shift in oscillation frequency. The graph shown in FIG. 14 depicts the measured C-V characteristic of a SOI PMOS transistor (W/L=120 μm/50 μm) at 500 kHz, using a Keithley 590 C-V meter.

Figure 10:
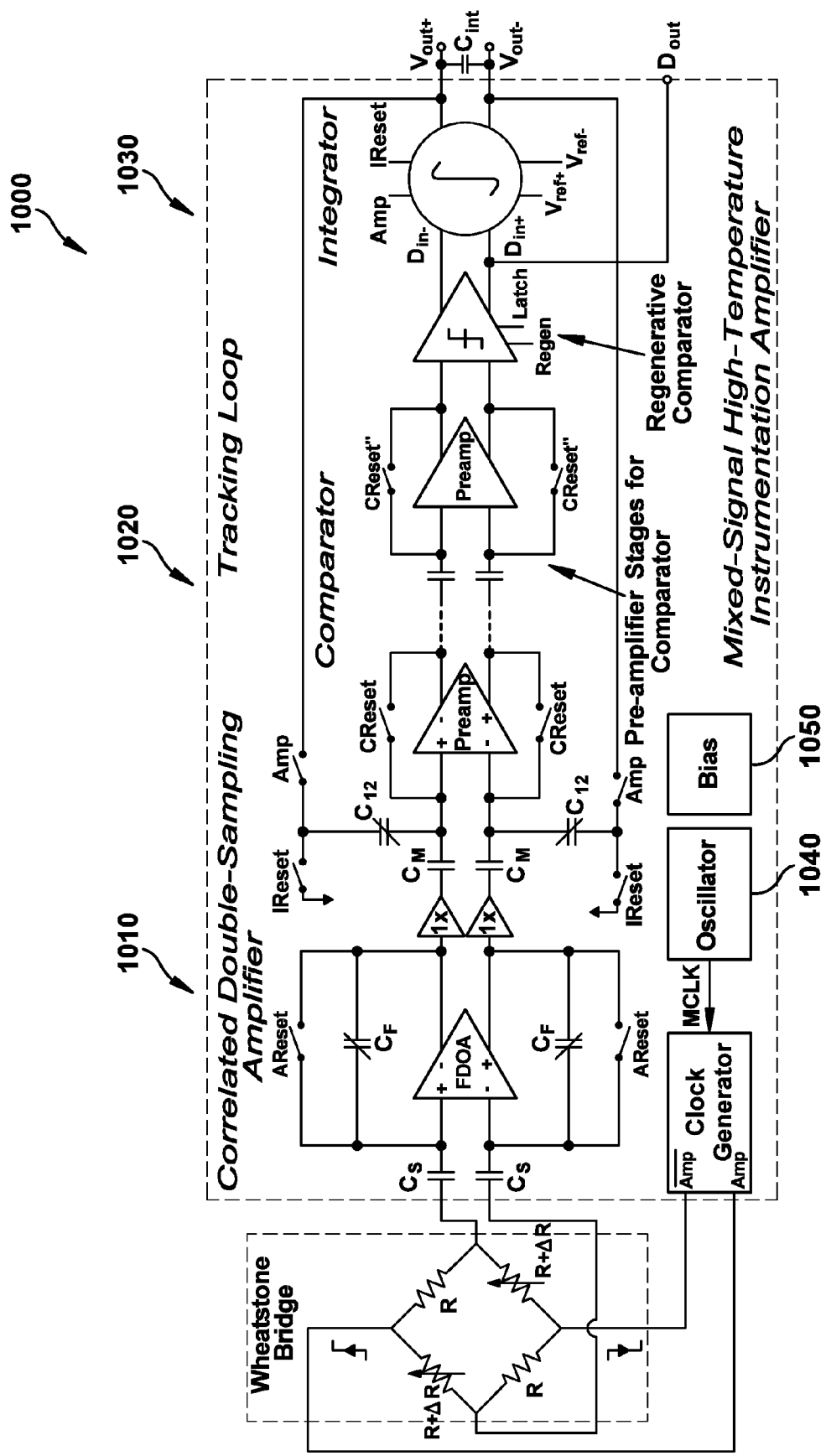
FIG. 10 is a schematic block diagram of a mixed-signal instrumentation amplifier using delta modulation to obtain filtered analog output.

FIG. 10 presents an illustration of a mixed-signal high-temperature SC (switched-capacitor) instrumentation amplifier 1000 that uses correlated double sampling 1010, a mixed signal tracking loop 1020, 1030, and constant-$g_m$ biasing 1050 to provide both analog and digital outputs. Correlated double-sampling (CDS) is used to reduce the effect of offset, 1/f noise, charge injection, and KT/C noise. A tracking loop analogous to delta modulation is implemented to convert the CDS amplifier output to a continuous-time signal. Besides the analog output, the tracking loop provides a digital output from its comparator that is proportional to the time derivative of the input. Since the signal is highly oversampled, the effect of the in-band thermal noise is also greatly reduced.

The CDS amplifier provides a selectable gain $G_A$ of 6, 12 or 24, which is set by the product of the ratio of $C_S/C_F$ of 3, 6 or 12 and a CDS gain of 2, and the tracking loop gives an additional gain $G_D$ of 2, 4 or 8 that is set by the ratio of $C_{I1}/C_{I2}$. The fully differential topology used throughout the integrated circuit is relatively immune to many high temperature effects, including bulk junction leakage, and can provide solid performance at high temperatures, ultimately limited by catastrophic loss of bias current to junction leakage.

A conventional folded-cascode transconductance amplifier 1010 is used as a fully differential opamp (FDOA), and biased using the constant-gm bias circuit. The opamp employs a SC common-mode feedback (CMFB) circuit. The size and current for the input pair are selected based on the consideration of noise, which, referred to the track loop output, is:

$$\overline{v_{ox}^2} = 2 \times G_D^2 \times \left(\frac{C_F + C_S + C_{gs} + C_{gd} + C_P}{C_F}\right)^2 \times 2 \times \frac{\pi}{2} \times \frac{8kT}{3g_{m1,2}} \times B$$

$C_{gs}$ and $C_{gd}$ represent the small-signal capacitance of the input transistors, $C_p$ is the input parasitic capacitance, $g_{m1,2}$ is the transconductance of the input transistor, and B is the noise bandwidth set by the CDS amplifier bandwidth. The first factor of two is due to the differential pair, the second factor of two is due to folding of thermal noise, and $\pi/2$ is the leaky factor of a first order low-pass filter.

The comparator uses a regenerative comparator 1020 with three cascaded offset-compensated pre-amplification stages in order to achieve required precision. The pre-amplifier uses the same topology as the oscillator delay cell but without the load capacitor and it is biased by the constant-$g_m$ bias circuit so that its gain and bandwidth will also be maintained over temperature.

The integrator 1030 performs 1-bit digital-to-analog (DAC) conversion and low-gain integration to obtain the correct trade-off between sample rate and resolution. The low-gain integrator requires large, off-chip capacitance and could be implemented using a 1-bit IDAC, but a mismatch or instability between reference current and integration capacitor would affect resolution.

Figure 11A:
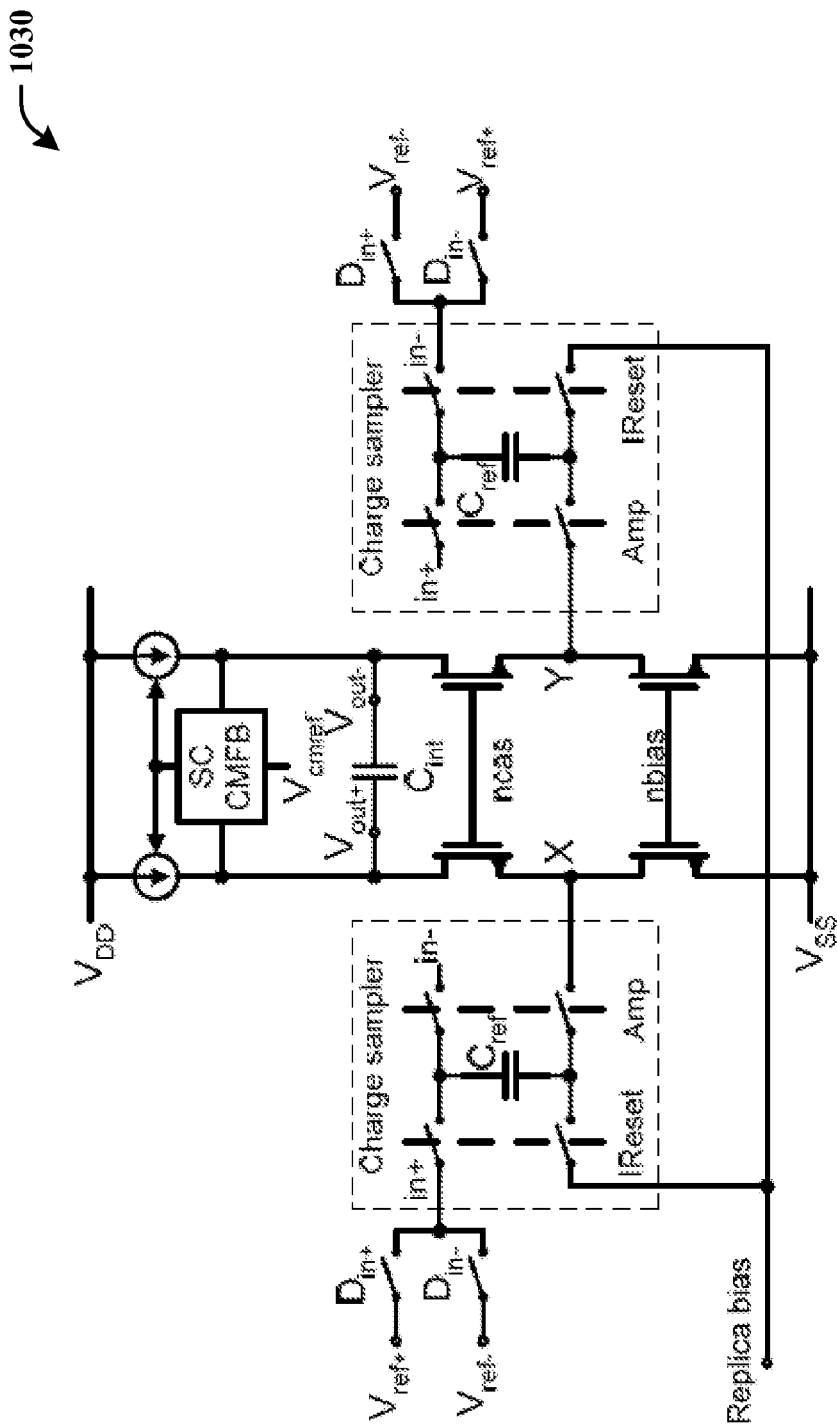
FIG. 11A is a transistor level circuit schematic of a fully differential integrator with continuous-time output using just one integration capacitor.

Instead, a novel fully-differential SC integrator 1030 with single off-chip integration capacitor is used to eliminate the need for precise current reference, as illustrated in FIG. 11A. For each clock cycle, charge is injected into the virtual ground nodes X and Y by the charge samplers, and then transferred to the integration capacitor $C_{int}$. Settling time of the pedestal is decided by the transconductance of NMOS cascode devices. The magnitude of injected charge difference on X and Y is:

$$C_{ref}(V_{ref+} - V_{ref-})$$

and its polarity depends on the comparator output $D_{in}$, so the quantization step on the differential output of the integrator is:

$$C_{ref}(V_{ref+} - V_{ref-})/C_{int}$$

which is stable over temperature since both the capacitor ratio and reference voltage have excellent temperature stability.

Figure 11B:
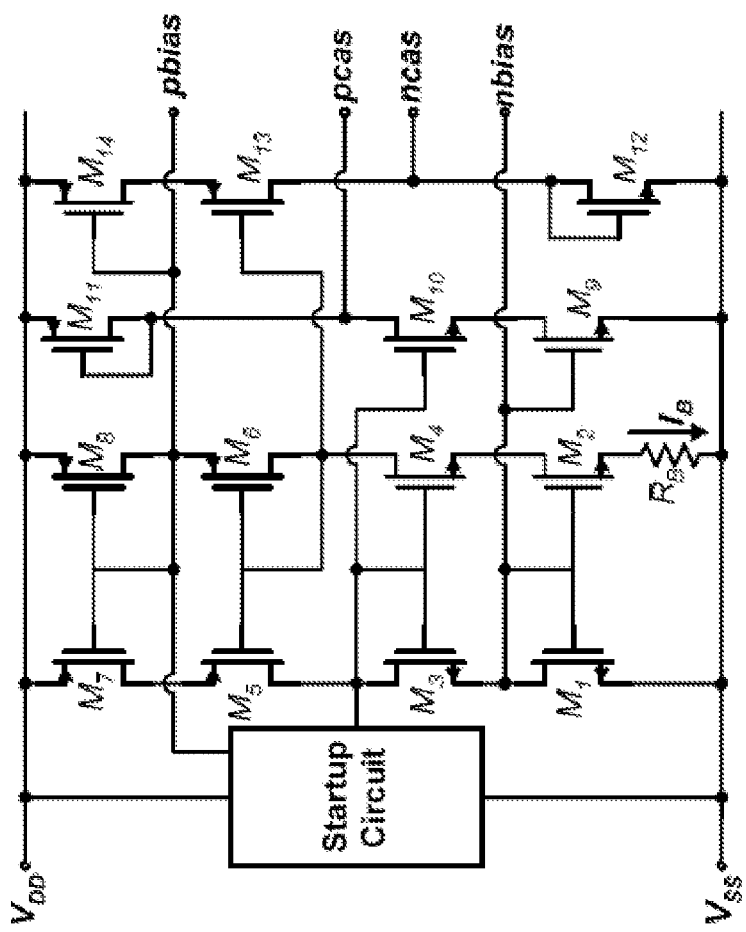
FIG. 11B is a transistor level circuit schematic of a bias circuit that enables temperature adaptive biasing.

FIG. 11B displays the implementation of a temperature-adaptive bias circuit 1050. Assuming matched transistors, and neglecting channel length modulation and the backgate effect on threshold voltage, the current through the resistor RB is:

$$I_B = \frac{2}{\mu_n C_{ox} R_B^2}\left(\sqrt{\frac{L_1}{W_1}} - \sqrt{\frac{L_2}{W_2}}\right)^2$$

where $\mu_n$ and $R_B$ are the primary sources of temperature dependence. The square-law model predicts that the transconductance $g_m$ of a transistor biased with this current is simply proportional to $1/R_B$. A conventional poly1 biasing resistor having a rated temperature coefficient (TC) of about 1000 ppm/° C. may be used.

Figure 11C:
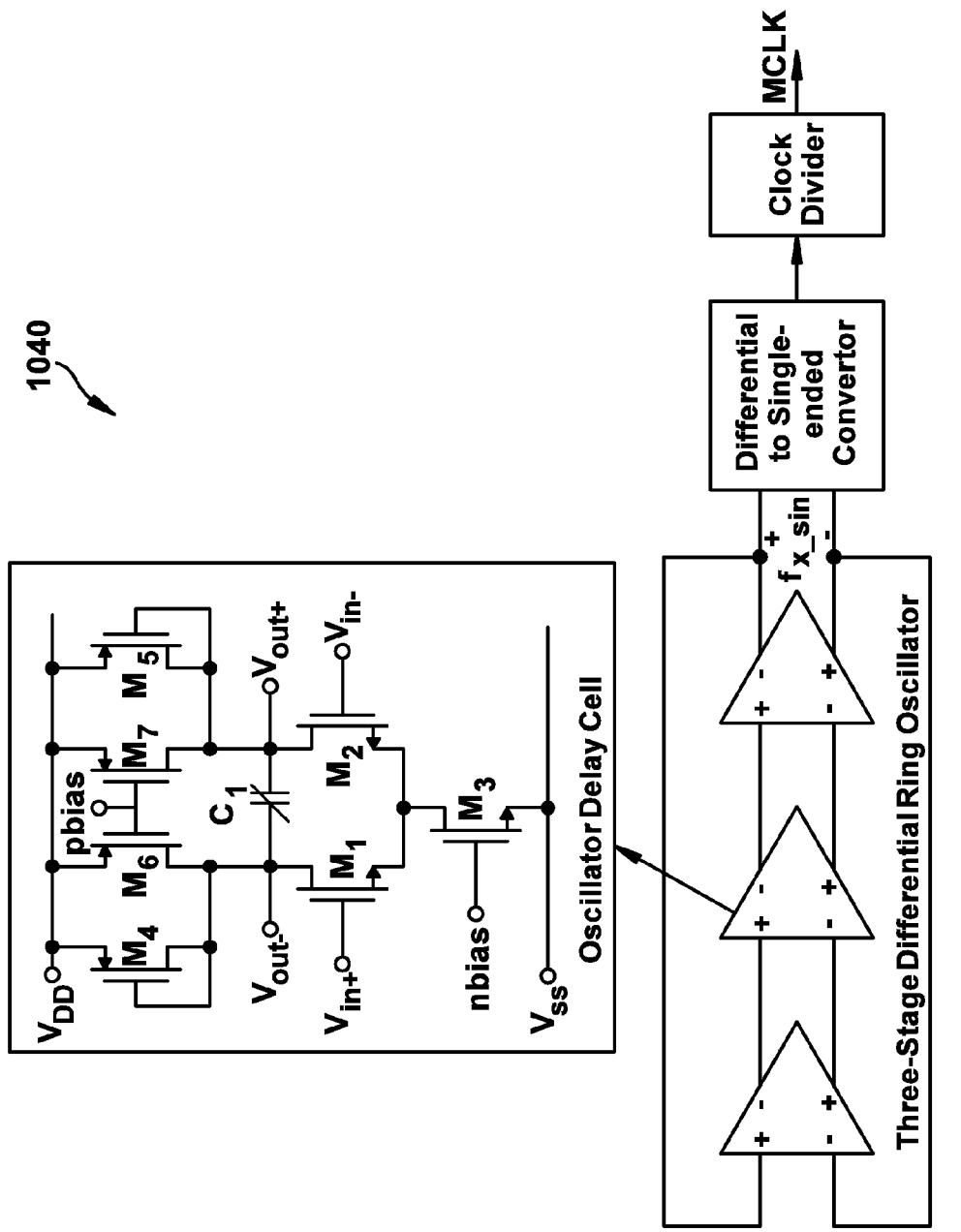
FIG. 11C is a schematic diagram of an oscillator that uses temperature adaptive biasing to obtain stable oscillation frequency over wide temperature variations.

As illustrated in FIG. 11C, a fully-integrated oscillator 1040 that provides the clock is detailed. The oscillator circuit employs a three-stage differential ring in which the gain of each stage, which must be $\geq 2$ to satisfy the oscillation criterion, is set by the ratio $g_{m1,2}/g_{m4,5}$, both of which are temperature stabilized. The oscillation frequency is proportional to $g_{m4,5}/C_L$, which is stabilized by the constant-$g_m$ biasing scheme. The differential pair in each stage is a scaled down replica of the differential pair in the amplifiers in the instrumentation amplifier, such that the oscillator frequency $f_{osc}$ is proportional to the GBW of those amplifiers, which in turn corresponds to the settling speed of the amplifier. Therefore, the settling time of the main amplifiers is locked to the oscillator frequency, and the oscillation frequency is stabilized by the constant-$g_m$ biasing scheme. In other words, accurate settling is maintained over a wide temperature range, and sampling rate, which sets resolution and/or throughout rate in an ADC or cutoff frequency in an SC filter, is also stabilized.

Figure 12:
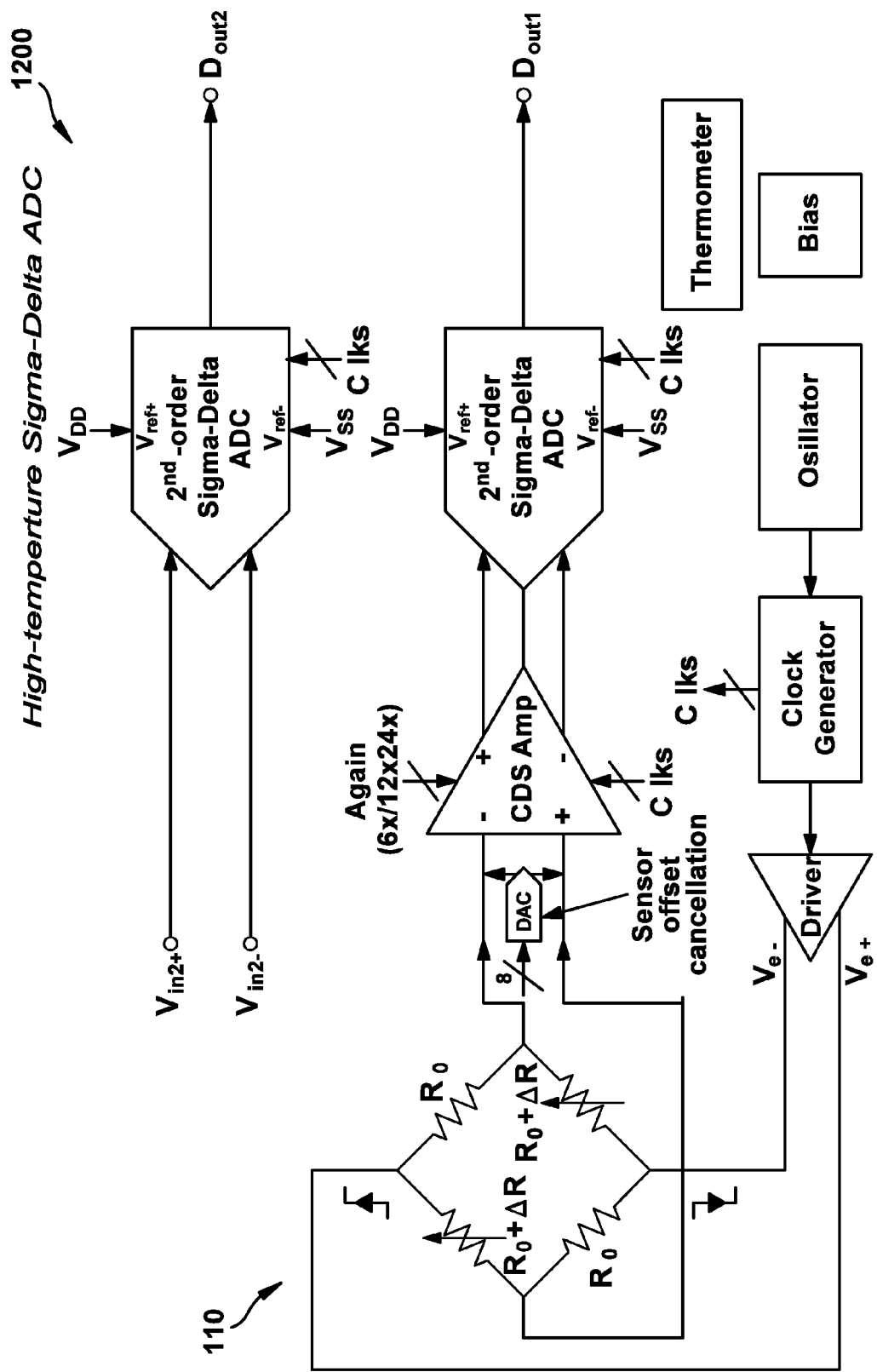
FIG. 12 is a schematic block diagram of an integrated circuit with double-sampled instrumentation amplifier and $2^{nd}$-order sigma-delta A/D converter.

FIG. 12 presents an illustration of a bulk CMOS, switched-capacitor $2^{nd}$-order sigma-delta modulator as positioned in an integrated circuit 1200 with pre-amplification to interface with a sensor 110. The modulator 1200 uses correlated double sampling, constant $g_m$ biasing, and a modulator architecture with coefficients adjusted to improve temperature stability. The CDS pre-amplifier has an adjustable gain GA of 6×/12×/24× and digitally-programmable sensor offset correction with 13 b dynamic range and 9 b resolution. There are two copies of the 2nd-order sigma-delta modulator, one of which is connected with the CDS pre-amplifier to interface with the sensor. Supporting circuits, including sensor driver, oscillator, bias circuit and thermometer circuit, are integrated to provide a single-chip solution for sensor interfacing. Only one off-chip capacitor is required for power supply by-pass. The sensor output and modulator reference are both scaled by the power supply $V_{DD}$, so the converter output is independent of supply voltage.

The fully differential topology used throughout the integrated circuit is relatively immune to many high temperature effects, including bulk junction leakage, but is ultimately limited by catastrophic loss of bias current to junction leakage. In an n-well process, PMOS transistors have much less leakage current at high temperature than do NMOS. PMOS switches are used at critical nodes of the SC circuitry to reduce errors caused by leakage. Dynamic logic is avoided in the digital circuits.

Precise transient behavior of any SC circuits is unimportant providing that charge is conserved and the circuitry is fully settled at the end of each clock cycle. Thus, accuracy depends primarily on capacitor ratios and the ratio of clock frequency $f_{osc}$ to opamp gain bandwidth (GBW). Capacitor ratios have very weak temperature dependence. A constant $g_m$ bias circuit is used to stabilize transconductance over temperature. A finite-gain-compensated CDS pre-amplifier may be used to remove low-frequency noise and finite amplifier gain error by way of double sampling, effectively squaring the open-loop gain of the operational amplifier. Since the temperature stability of the fully-differential operational amplifier affects performance of the pre-amplifier and modulator, a folded cascade topology may be used, so that transconductance is stabilized over temperature.

Figure 13A:
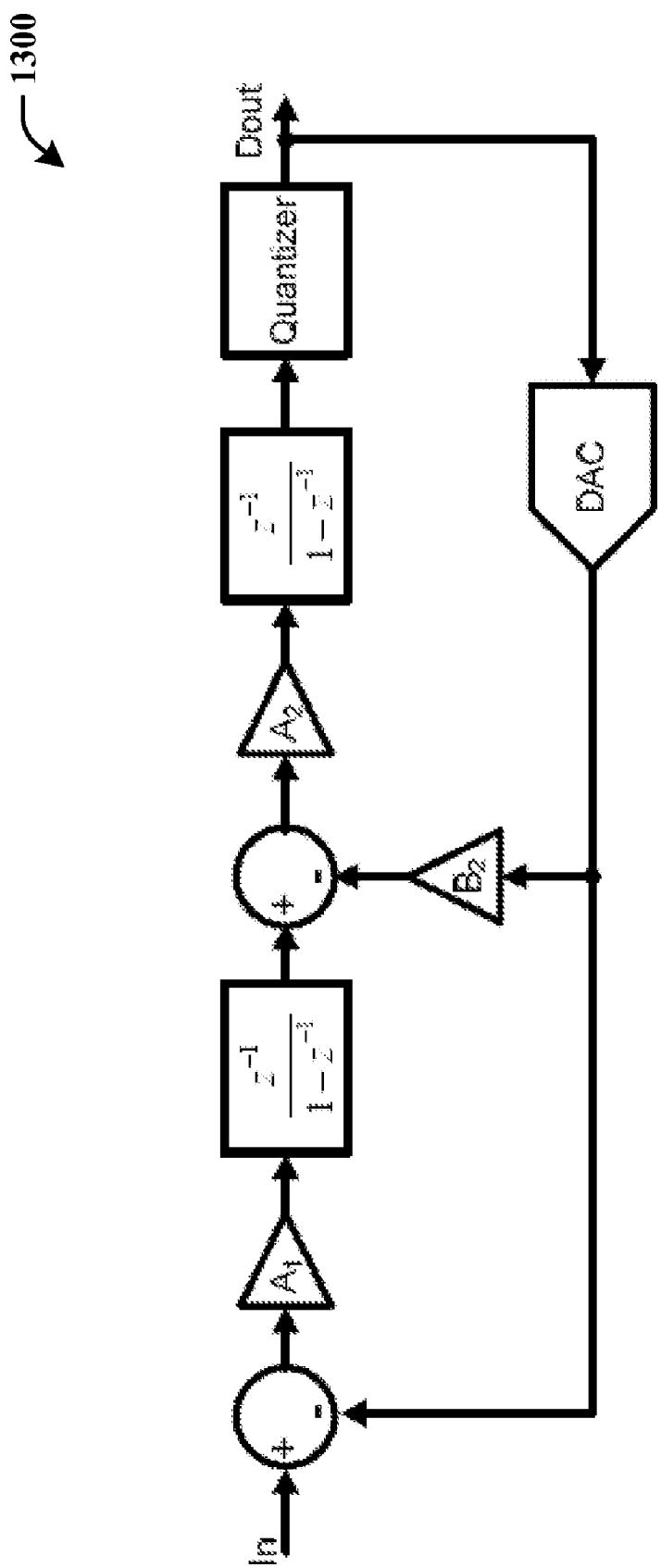
FIG. 13A illustrates a discrete-time model of a $2^{nd}$-order sigma-delta modulator.

FIG. 13A illustrates a block diagram of a 2nd-order sigma-delta modulator 1300 that provides improved resolution, as compared to the $1^{st}$-order modulator. Integrator output swing limits the modulator dynamic range. As temperature increases, the output swing of integrators are reduced by the constant-$g_m$ biasing, so modulator parameters were reduced to lower the signal range of the first-stage integrator, and thereby avoid integrator nonlinearity.

Figure 13B:
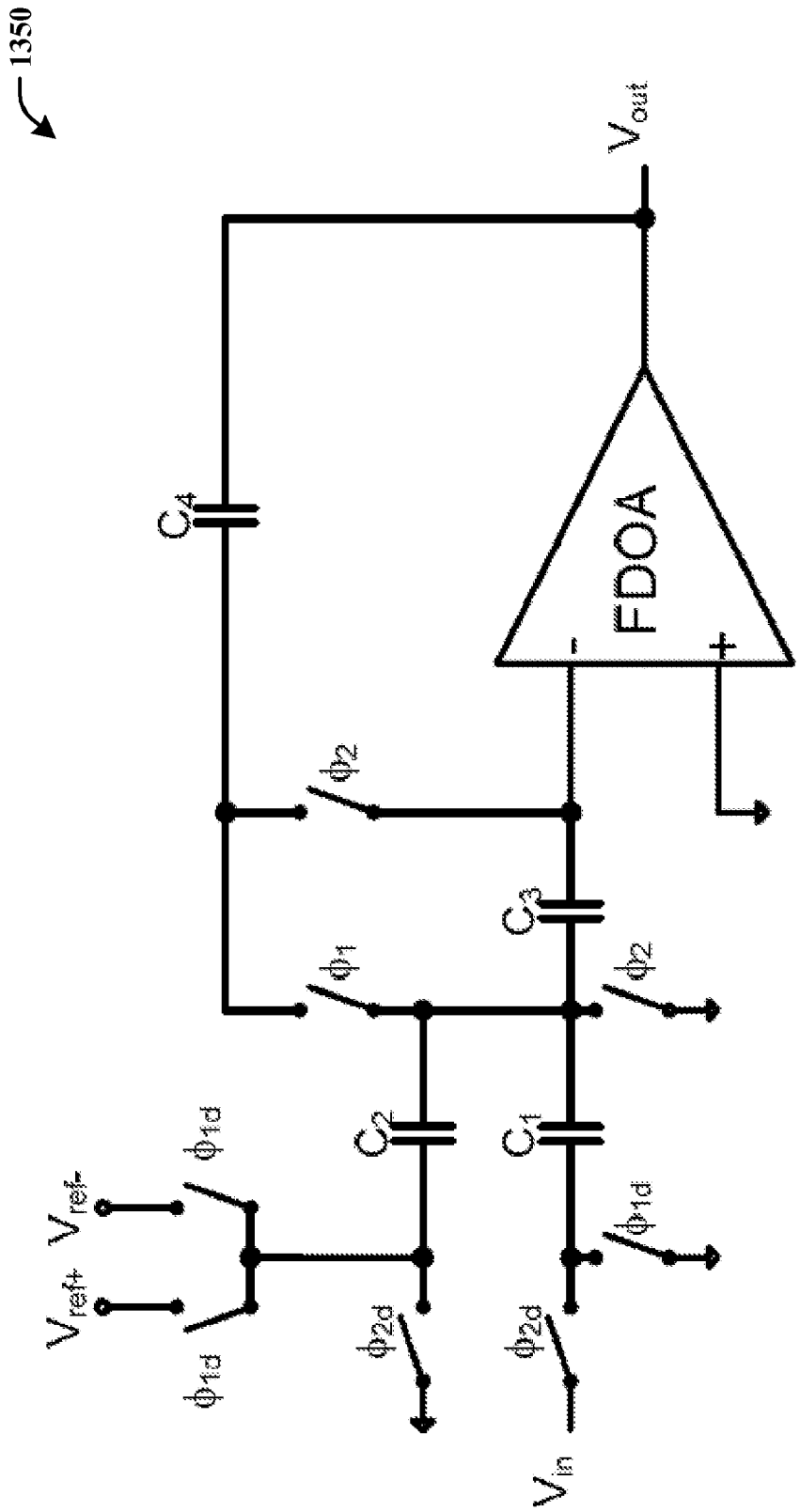
FIG. 13B is a schematic block diagram of a switched-capacitor integrator with finite-gain compensation.

As depicted in FIG. 13B, the offset, low-frequency noise, and linearity of the first-stage integrator 1350 limits the modulator performance. The reference and input signals of the SC CDS integrator use different input capacitors, instead of sharing the same capacitor, which provides at least two advantages. First, it permits reference scaling, so $V_{DD}$ and $V_{SS}$ can be used for $V_{ref+}$ and $V_{ref-}$, while choosing $C_2=C_1/2$ sets the maximum modulator differential input range to $\pm V_{DD}/2$. Second, capacitor sharing can cause harmonic distortion since the current drawn from the reference is signal-dependent.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates reliable sensing in harsh environments, comprising:
   a sensor that receives a signal;
   an integrated circuit that processes the signal to provide an output signal, the integrated circuit comprising:
   an amplifier that amplifies the signal in analog format to provide an amplified analog signal, the amplifier has a bandwidth that is locked to a clock frequency of a clock signal, the clock frequency is proportional to:

$g_m/C$ where $g_m$ represents transconductance of biasing transistors in an oscillator that provides the clock signal and C represents capacitance of a load capacitor of the oscillator;
   an output circuit portion configured to process the amplified signal to provide the output signal as including at least one of an analog output and a digital output based on the amplified analog signal; and
   a biasing circuit configured to provide constant-gm biasing to the amplifier and to the output circuit portion to maintain gain and bandwidth thereof over temperature; and
   an antenna that implements wireless transmission of the output signal.

2. A system that facilitates reliable sensing in harsh environments, comprising:
   a sensor that receives a signal;
   an integrated circuit that processes the signal to provide an output signal, the integrated circuit comprising;
   an amplifier that amplifies the signal in analog format to provide an amplified analog signal;
   an output circuit portion configured to processes the amplified signal to provide the output signal as including at least one of an analog output and a digital output based on the amplified analog signal; and
   a biasing circuit configured to provide constant-gm biasing to the amplifier and to the output circuit portion to maintain gain and bandwidth thereof over temperature;
   an antenna that implements wireless transmission of the output signal; and
   a digital transmitter that includes a voltage-controlled oscillator and transmits the signal via the antenna based on the digital output, wherein the digital transmitter comprises a digital frequency-shift keying (FSK) transmitter comprising:
   a buffer coupled to receive the digital output from the output circuit portion to provide a buffered output signal;
   a tank circuit configured to resonate at a carrier frequency and providing an oscillator output signal in response to the buffered output signal, the oscillator output signal driving the antenna to implement wireless transmission of the digital output, wherein the tank circuit further comprises:
   a varactor driven by the buffered output signal;
   a tunnel diode coupled to an output of the varactor; and
   a planar loop antenna coupled to the output of the varactor, the planar loop antenna having an inductance and a resistance that combine with capacitance of the varactor and the tunnel diode to form the tank circuit, the loop antenna providing the wireless transmission of the digital output.

3. A system that facilitates reliable sensing in harsh environments, comprising:
   a sensor that receives a signal;
   an integrated circuit that processes the signal to provide an output signal, the integrated circuit comprising:
   an amplifier that amplifies the signal in analog format to provide an amplified analog signal;
   an output circuit portion configured to process the amplified signal to provide the output signal as including at least one of an analog output and a digital output based on the amplified analog signal; and
   a biasing circuit configured to provide constant-gm biasing to the amplifier and to the output circuit portion to maintain gain and bandwidth thereof over temperature, wherein the biasing circuit further comprises:
   a plurality of transistors configured as a current mirrors to provide the constant-$g_m$ biasing for the integrated circuit, such that transconductance of transistors in the integrated circuit that are biased by the biasing remain substantially constant over temperature
   a biasing resistor through which a biasing current is provided, the transconductance of the transistors in the integrated circuit that are biased based on the biasing current is inversely proportional to a resistance of the biasing resistor; and
   an antenna that implements wireless transmission of the output signal.

4. The system of claim 3, wherein the biasing resistor comprises a poly 1 biasing resistor having a known temperature coefficient.

5. A system that facilitates reliable sensing and signal processing in harsh environments, comprising:

an integrated circuit that processes an analog signal provided by an external sensor, the integrated circuit comprising:

an amplifier that amplifies the analog signal to provide an amplified analog signal;

an output circuit portion configured to process the amplified signal to provide at least a corresponding digital output based on the amplified analog signal; and a biasing circuit configured to provide constant-gm biasing to the amplifier and to the output circuit portion to maintain gain and bandwidth over temperature thereof, wherein the biasing circuit further comprises:

a plurality of transistors configured as a current mirrors to provide the constant-$g_m$ biasing for the integrated circuit, such that transconductance of transistors in the integrated circuit biased by the biasing remain substantially constant over temperature; and a biasing resistor through which a biasing current is provided, the transconductance of the transistors in the integrated circuit that are biased based on the biasing current being inversely proportional to a resistance of the biasing resistor.

6. A system that facilitates reliable sensing and signal processing in harsh environments, comprising:

an integrated circuit that processes an analog signal provided by an external sensor, the integrated circuit comprising:

an amplifier that amplifies the analog signal to provide an amplified analog signal;

an output circuit portion configured to process the amplified signal to provide at least a corresponding digital output based on the amplified analog signal; and a biasing circuit configured to provide constant-gm biasing to the amplifier and to the output circuit portion to maintain gain and bandwidth over temperature thereof;

a digital transmitter that includes a voltage-controlled oscillator that provides a modulated output signal based on the corresponding digital output provided by the output circuit portion of the integrated circuit, wherein the digital transmitter comprises a digital frequency-shift keying (FSK) transmitter comprising:

a buffer coupled to receive the digital output from the output circuit portion to provide a buffered output signal;

a tank circuit configured to resonate at a carrier frequency and providing an oscillator output signal, corresponding to the modulated output signal, in response to the buffered output signal, the oscillator output signal driving the antenna to implement the wireless transmission of the digital output, wherein the tank circuit further comprises:

a varactor driven by the buffered output signal;

a tunnel diode coupled to an output of the varactor; and a planar loop antenna coupled to the output of the varactor, the planar loop antenna having an inductance and a resistance that combine with capacitance of the varactor and the tunnel diode to form the tank circuit, the loop antenna providing for the wireless transmission of the digital output; and an antenna configured to wirelessly transmit the modulated output signal.

7. A system that facilitates reliable sensing and signal processing in harsh environments, comprising:

an integrated circuit that processes an analog signal provided by an external sensor, the integrated circuit comprising:

an amplifier that amplifies the analog signal to provide an amplified analog signal;

an output circuit portion configured to process the amplified signal to provide at least a corresponding digital output based on the amplified analog signal;

a biasing circuit configured to provide constant-gm biasing to the amplifier and to the output circuit portion to maintain gain and bandwidth over temperature thereof, wherein the biasing circuit further comprises a plurality of transistors configured as a current mirrors to provide the constant-$g_m$ biasing for the integrated circuit, such that transconductance of transistors in the integrated circuit biased by the biasing remain substantially constant over temperature; and an oscillator that provides a clock signal having a frequency, the oscillator being biased by the substantially constant-$g_m$ biasing provided by the biasing circuit so that the frequency of the clock signal is resistant to temperature changes.

* * * * *